US006995763B2

(12) United States Patent
Gatti et al.

(10) Patent No.: US 6,995,763 B2
(45) Date of Patent: Feb. 7, 2006

(54) INTERACTIVE SCULPTING FOR VOLUMETRIC EXPLORATION AND FEATURE EXTRACTION

(75) Inventors: Claudio Gatti, Toronto (CA); Vittorio Accomazzi, Toronto (CA); Robert Chann, North York (CA)

(73) Assignee: Cedara Software Corp., Mississauga (CA)

( * ) Notice: Subject to any disclaimer, the term of this patent is extended or adjusted under 35 U.S.C. 154(b) by 603 days.

(21) Appl. No.: 09/909,900

(22) Filed: Jul. 23, 2001

(65) Prior Publication Data

US 2002/0009224 A1 Jan. 24, 2002

Related U.S. Application Data

(63) Continuation of application No. PCT/CA00/00043, filed on Jan. 21, 2000.

(51) Int. Cl.
*G05T 17/00* (2006.01)
(52) U.S. Cl. ...................... 345/424; 345/420; 345/583; 345/606; 345/626
(58) Field of Classification Search ................ 345/420, 345/424, 583, 606, 626
See application file for complete search history.

(56) References Cited

U.S. PATENT DOCUMENTS

| | | | | |
|---|---|---|---|---|
| 3,788,820 | A | * | 1/1974 | Hunt ........................... 428/586 |
| 5,113,357 | A | * | 5/1992 | Johnson et al. ............. 345/424 |
| 5,201,035 | A | | 4/1993 | Stytz et al. |
| 5,570,460 | A | | 10/1996 | Ramanujam |
| 6,606,091 | B2 | * | 8/2003 | Liang et al. ................. 345/424 |

FOREIGN PATENT DOCUMENTS

GB 2231759 A 11/1990

OTHER PUBLICATIONS

Richardson A.E. et al.: "A Volumetric System for Interactive Three-Dimensional Design"—Journal of Imaging Technology vol. 17, No. 4. Aug. 1, 1999, pp. 188-194.
Wang S.W. et al.: "Volume Sculpting"—Proceedings of the Symposium on Interactive 3D Graphics 1995, pp. 151-156.
Ney D.R. et al.: "Volumetric Rendering of Computed Tomography Data: Principles and Techniques"—IEEE Computer Graphics and Applications vol. 10, No. 2, Mar. 1, 1990, pp. 24-32.
Robb R.A. et al.: "Interactive Display and Analysis of 3-D Medical Images"—IEEE Transactions on Medical Imaging, vol. 8, No. 3, 1989, pp. 217-226.
Raya S.P. et al.: Shape-Baased Interpolation of Multidimensional Objects:—IEE Transactions on Medical Imaging, vol. 9, No. 1, 1990, pp. 32-42.

* cited by examiner

*Primary Examiner*—Kimbinh T. Nguyen
(74) *Attorney, Agent, or Firm*—John R. S. Orange; Santosh K. Chari; Sean X. Zhang (57) ABSTRACT

The present invention provides a system of extracting a visual feature from a dataset, comprising a storage means for storing said dataset; retrieval means for retrieving said dataset from said storage means; display means for displaying an image of said retrieval dataset; means for defining a block of voxels corresponding to a selected portion of said displayed dataset, said block containing said visual feature therein; means for removing from said block voxels not containing said visual feature, to generate a feature block; means for generating a mask from said feature block; and means for rendering said dataset using said mask. A method of extracting visual features is also provided.

32 Claims, 10 Drawing Sheets

INTERACTIVE SCULPTING FOR VOLUMETRIC EXPLORATION AND FEATURE EXTRACTION

This application is a continuation of PCT/CA00/00043 filed on Jan. 21, 2000.

The present invention relates to the field of three-dimensional (3-D) image rendering. More specifically, the present invention provides a system and method of interactive sculpting for volumetric exploration and feature extraction.

BACKGROUND OF THE INVENTION

Volume visualization has become increasingly important in clinical practice for the display and analysis of volumetric diatasets acquired with imaging methods such as Computed Tomography (CT) or Magnetic Resonance Enaging (MRI). Benefits of volume visualization include the ability to obtain oblique views, the increased understanding of complex geometric structures; and the ability to measure volumes, areas, and distances. Volume visualization also provides the ability to explore the spatial relationship between an organ and its surrounding structures or tissues. There are two main classes of volume visualization techniques; surface rendering and volume rendering. The present invention relates to volume rendering which is a technique that generates a two-dimensional (2-D) projection directly from the 3-D volume data without requiring any intermediate geometrical data structure.

Many different approaches to volume rendering have been proposed over the years. However, they all suffer to some extent from the problem that volume rendering algorithms are computationally and memory intensive, although, ever-increasing processor speed, affordable memory, and clever optimizations have made it possible to perform volume rendering on low-cost, general purpose personal computers. However, even with interactive rendering speed, the exploration and visualization of a volumetric dataset is a challenging task. The increasing amount of data produced by the imaging devices and the occlusion of the structures of interest by other portions of the subject call for flexible methods to focus the visualization to a very specific part of the dataset.

The classical approach to address these issues has been 3-D anatomical feature extraction by segmentation. These methods tend to be very time consuming (i.e. slice by slice tracing) or very anatomy and/or imaging modality specific. A number of researchers have proposed a more general semi-automatic segmentation method, however the binary decision process imposed by the segmentation method often results in loss of information and reduced image quality. See, for example, Schiemann et al., "Interactive 3D Segmentation", Visualization in Biomedical Computing 1992, SPIE Vol. 1808, pp. 376–383, which is incorporated herein by reference.

An alternative approach is to remove regions with no diagnostic value or regions that obscure the structure of interest, rather than extracting the structure itself. The classical axis-aligned cut plane model is often used for this purpose but in many cases, when complicated morphologies are present, the results are far from optimal. Pflessor et al., "Towards Realistic Visualization for Surgery Rehearsal" First International Conference of Compute Vision, Virtual Reality and Robotics in Medicine (CVR Med '95), pp. 487–491, April 1995, which is incorporated herein by reference, presents a volume sculpting technique with application to surgery rehearsal. However, in this technique a segmentation step is required prior to data manipulation. The technique introduced sculpting tools that perform free-form cutting of pre-segmented objects. Wang and Kaufrnan "Volume Sculpting", 1995 Symposium on Interactive 3D Graphics, pp. 157–156, April 1995, which is incorporated herein by reference, provides a similar technique but with the focus on a modeling tool for the creation of a three-dimensional object, not on the extraction of specific features from a volume dataset.

It is an object of the present invention to provide a system and method of volume rendering which overcomes the deficiencies of the prior art.

SUMMARY OF THE INVENTION

In one aspect, the present invention provides a system of extracting a visual feature from a volumetric dataset using an approximate volume. The system comprises a display for displaying the volumetric dataset; an input device for defining a selected number of regions distributed in the displayed volumetric dataset, each of the regions containing a cross section of the visual feature therein; an interpolator for generating the approximate volume containing the selected regions, the approximate volume comprising a set of voxels selected from the dataset; an operator for specifying a plurality of voxels not containing the visual feature in the set of voxels to generate a mask; and a volume rendered for using the mask to render the volumetric dataset to extract the visual feature therefrom. The selected number of regions are a subset of the total number of images contained in the volumetric dataset.

In another aspect, the present invention provides a method for extracting a visual feature from a volumetric dataset, using an approximate volume. The method comprises the steps of displaying the volumetric dataset; defining a selected number of regions distributed in the displayed volumetric dataset, each of the regions containing a cross section of the visual feature therein; generating through interpolation, the approximate volume comprising a set of voxels selected from the volumetric dataset; specifying a plurality of voxels not containing the visual feature in the set of voxels to generate a mask; and rendering using the mask on the volumetric dataset to extract the visual feature therefrom. The selected number of regions are a subset of the total number of images contained in the volumetric dataset.

In yet another aspect, the present invention provides an article of manufacture comprising a computer usable medium having a computer readable program code embodied therein for extracting a visual feature from a volumetric dataset using an approximate volume, the dataset representing an image of an object, the computer readable program code in the article of manufacture comprising; the computer readable program code configured to cause the computer to display the dataset; the computer readable program code configured to cause the computer to receive input for defining a selected number of regions distributed displayed volumetric dataset, each of the regions containing a cross section of the object therein; the computer readable program code configured to cause the computer to generate through interpolation the approximate volume containing the selected regions, the approximate volume comprising a set of voxels selected from the volumetric dataset; the computer readable program code configured to cause the computer to use the mask for rendering the volumetric database to extract the object therefrom. The selected number of regions are a subset of the total number of images contained in the volumetric dataset.

BRIEF DESCRIPTION OF THE FIGURES

Embodiments of the present invention will now be described, by way of example only, with reference to the following figures, in which.

DETAILED DESCRIPTION OF A PREFERRED EMBODIMENT

Figure 1:
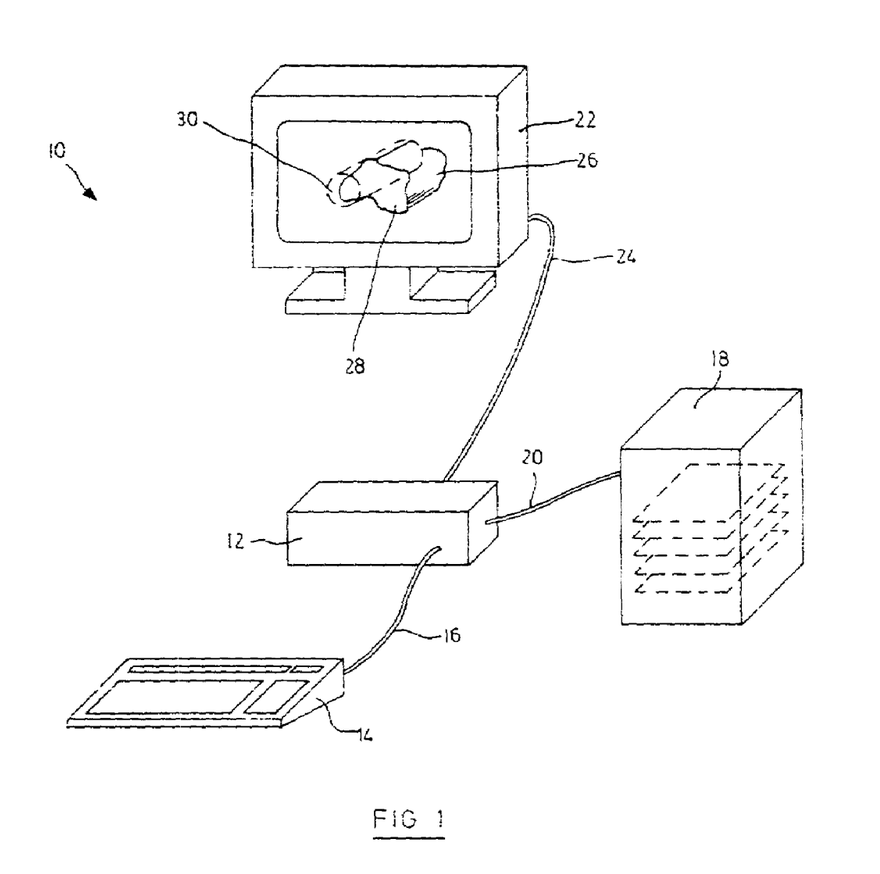
FIG. 1 is a schematic overview of a system in accordance with the present invention.

A system in accordance with the present invention is shown generally at 10 in FIG. 1. System 10 comprises a processor 12 connected to a user input device 14. User input device 14 may be, for example, a keyboard, a mouse or a touch-screen display. Processor 12 is also connected to a data storage unit 18, and to display means 22.

Data storage unit 18 is used to store pre-acquired 2-D image slices of a subject in digital form. The stacks of slices are generally referred to as a dataset. The 2-D image slices are represented by dashed lines in FIG. 1. The 2-D image slices may be acquired using any imaging technique, including but not limited to Computed Tomography, Magnetic Resonance Imaging, and Ultrasound.

Display means 22 displays a, rendered volume 26 which is reconstructed from the pre-acquired 2-D image slices stored in data storage unit 18. The rendered volume displayed in FIG. 1 has a "cut-surface" 28 and a defined "volume of interest" (VOI) 30 which will be explained below.

Prior to describing the method of volumetric exploration and feature extraction of the present invention, the two primary tools of the present invention will be described.

(i) The Jigsaw

The jigsaw is a versatile cutting tool. The jigsaw can be used in a number of different ways. The simplest way is to reduce the effective size of the bounding box by sawing off rectangular regions. In practice, the jigsaw can be used to quickly remove structures that obscure the anatomy of interest. This method is efficient because careful outlining of unwanted structures is not required. It also plays an important role in fast exploration of multiple datasets.

When reducing the size of the bounding box is not adequate for removing unwanted anatomy one could use the jigsaw to generate a cylindrically extruded mask, whose cross section is defined by an arbitrary 2-D shape. This tool is not restricted to three orthogonal views. In fact, the direction of extrusion is normal to the plane on which the 2-D shape is defined. In other words, this tool can be applied from any viewing angle, with 2-D MPR (multi-planar reformat) or 3-D volume rendering. Furthermore, one could use the jigsaw to either specify a region to be removed (exclusive) or a region to be visualized (inclusive). This is very useful, for example, in removing the spine in abdominal studies.

Figure 2:
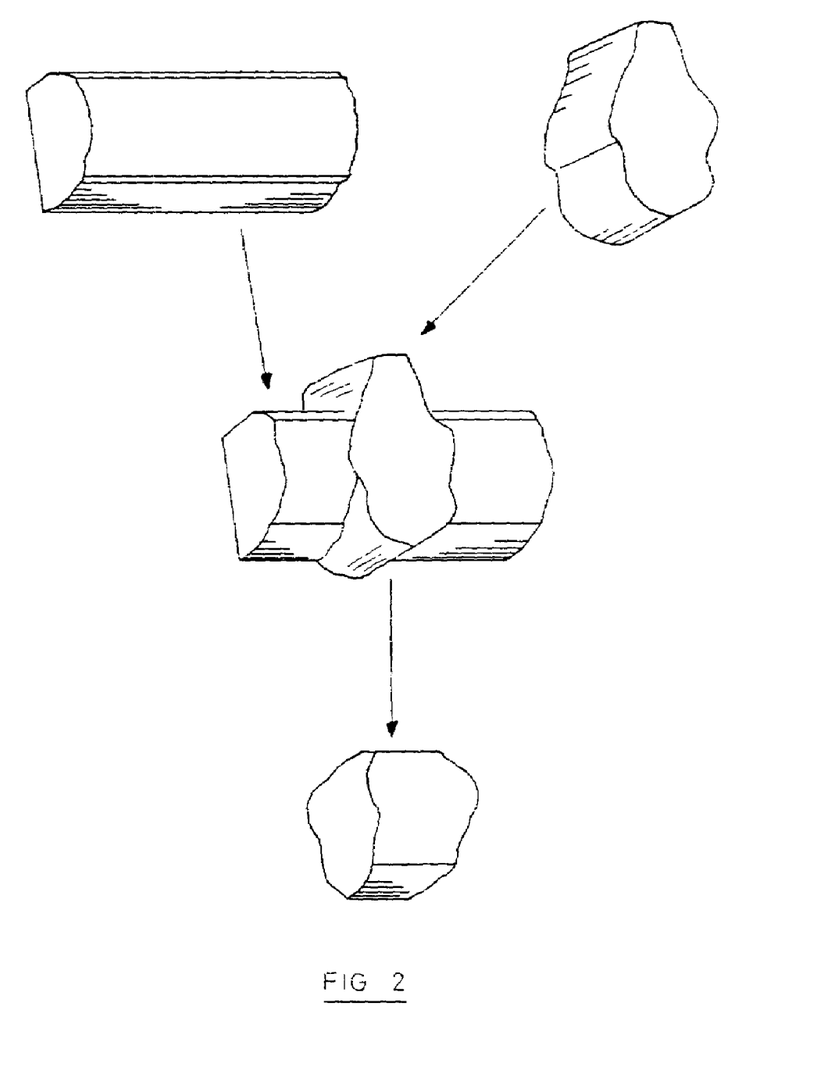
FIG. 2 is an illustration of the use of a jigsaw tool in accordance with the present invention.

In most cases, the jigsaw is used only to produce a suitable extruded volume but, occasionally, refinement is necessary. Multiple application of the jigsaw is equivalent to computing the intersection between two or more extruded masks. FIG. 2 illustrates how applying the jigsaw tool in two different orientations can refine a 3-D shape. The implementation of the jigsaw is dependant upon the implementation of the renderer and the masking operation.

(ii) The Interpolator

The Interpolator uses a technique known as shape interpolation to generate masks for the volume rendering operation. Traditionally, shape interpolation has been used to create binary volume for solid rendering. However, the present approach is to employ this technique for feature extraction. The inputs to this tool are inexact region(s) of interest obtained from manual contouring of a few 2-D images (typically, 10 for a dataset with 200 images). The advantage of using this tool is that it is much more time-effective than the painstaking process of manually outlining the object(s) of interest on every image of the dataset.

The interpolator works by first converting the binary input slices to distance images. In these images, each pixel value represents the shortest distance between the pixel and the nearest edge. A positive value indicates that a pixel is inside the region of interest and a negative value means outside. Cubic spline interpolation is used to compute the missing data in the gaps, resulting in a series of intermediate slices, which must then undergo a thresholding operation to produce the final mask. A suitable shape interpolator implementation is described in S. P. Raya and J. K. Udupa, "Shape-Based Interpolation of Multidimensional Objects", IEEE Transactions on Medical Imaging, vol. 9, no. 1, pp. 32–42, 1990, incorporated herein by reference.

Figure 3:
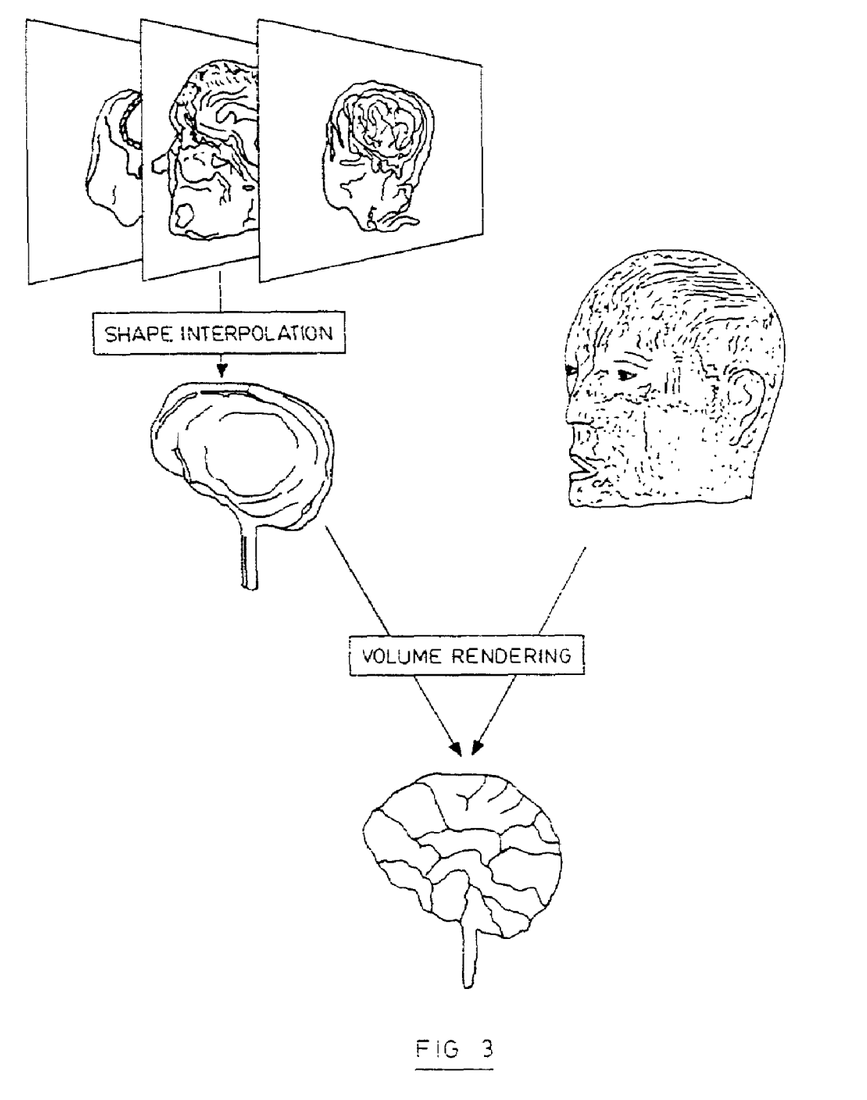
FIG. 3 is an illustration of the use of an interpolator tool in accordance with the present invention.

Both the tools discussed above are used to define volumes of interest (VOI). VOI are irregular volumetric regions that can be used to define the region where the volume rendering visualization is applied. The VOI does not have to exactly match the structure of interest, but rather loosely contain it or exclude the obstructing anatomies. The direct volume rendering process, by using an appropriate opacity transfer function, will allow for the visualization of all the details contained in the VOI. The main benefit of this type of approach is that the creation of the VOI is very time-effective, and it can be applied to a variety of different modalities. For example, as shown in FIG. 3, to extract the brain in an MR dataset the user roughly outlines the brain contour on a few slices and then lets the Interpolator tool generate the VOI. This is particularly significant on MRI datasets because the underlying physics is no compatible with the use of opacity transfer functions in volume rendering for tissue separation.

In most clinical protocols there is the need to extract multiple features, or to separate in different sections a part of the anatomy. This means that it is preferable to have the ability to apply multiple VOIs to a single dataset. The volume renderer of the present invention solves this problem in a very general way, by providing the user with the option to define multiple masks and also with options for assigning a different opacity and color transfer function to the voxels included in each region. This essentially defines a local classification, where the color and opacity of a voxel does not only depend on its gray level value, but also on its spatial position.

Figure 4A:
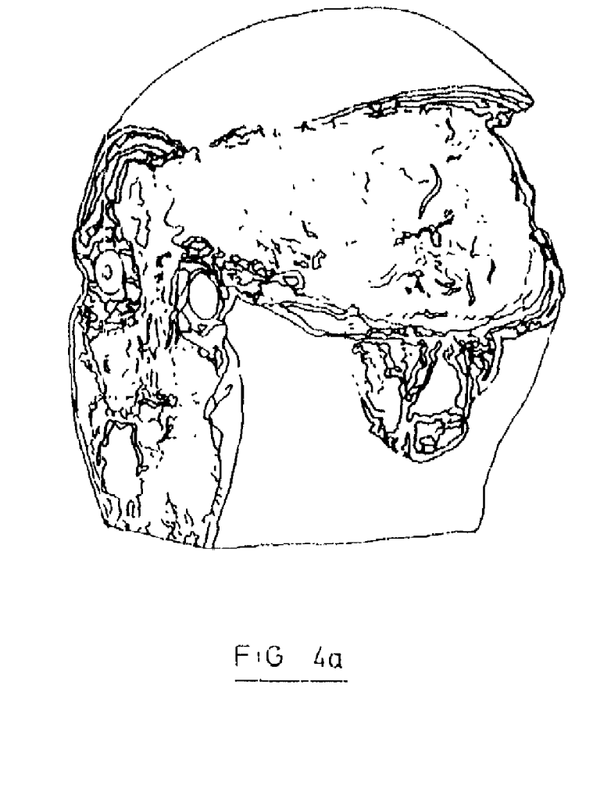
FIGS. 4(a) and 4(b) are examples of images generated by the system of the present invention.
Figure 4B:
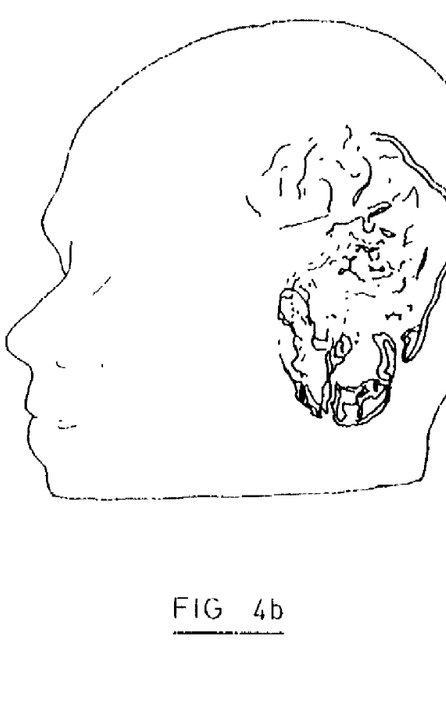

As discussed above, the brain can be easily extracted from an MR dataset using the Interpolator tool. A second VOI can be created using the jigsaw tool in exclude mode starting from the original dataset. The head and the brain are two distinct VOIs and different opacities, color settings, and even rendering modes can be applied to them. In FIG. 4 they are rendered together, allowing one to simulate regular as well as unusual extensive craniotomy.

Figure 5A:
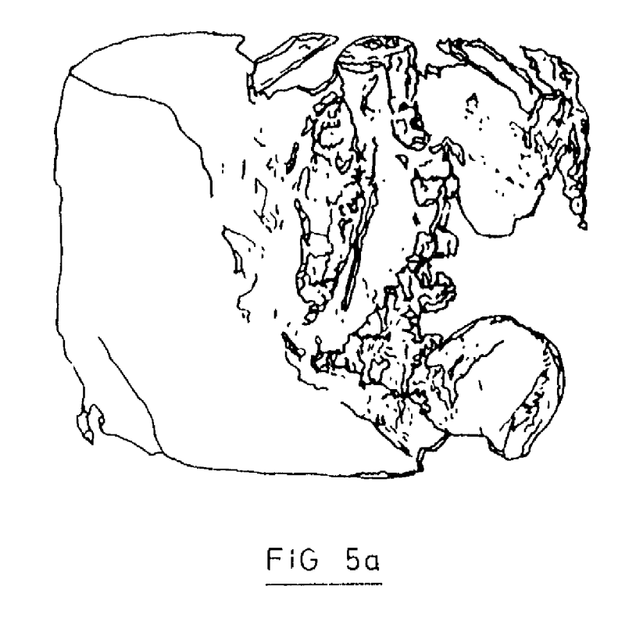
FIGS. 5(a) and 5(b) are examples of images generated by the system of the present invention.

In both CT and CTA dataset most of the tissues have distinct Hounsfield values, and so the opacity can be used to selectively visualize a particular tissue type. Nevertheless the sculpting tools can be used to enhance the visualization, by either applying local classification to specific anatomical part or to maintain references in the dataset. FIG. 5 shows the sculpting techniques applied to both a CT and CTA dataset. In the image shown in FIG. 5(a), the aorta has been identified with the Interpolator tool by drawing very few contours on the original slices. The rest of the dataset has been partitioned in two regions using the jigsaw tool. In these three regions different classification has been applied and all the VOI have been rendered using shaded volume rendering.

Figure 5B:
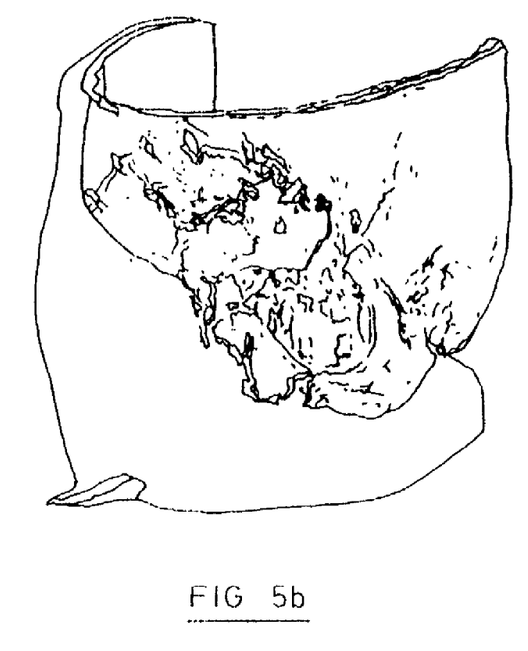

In the FIG. 5(b) the dataset has been similarly partitioned using the Jigsaw tool. A different classification has been assigned to the two VOI to show soft tissue in one and bone in the other. Both VOI are rendered in unshaded mode using the original density values.

A preferred embodiment of the present system has been implement with the Imaging Applications Platform (IAP) application development toolkit, an object-based software development package specifically designed for medical imaging applications development. IAP is designed for visual data processing, and therefore all the important 3-D data structures are voxel based. The two most important are: binary solid, and gray level slice stack. Several objects in our visualization pipelines accept both types of data, providing a high level of flexibility and inter-operability. For example, a binary solid can be directly visualized, or used as a mask for the volume rendering of a gray level slice stack. Conversely, a gray level slice stack can be used to texture map the rendering of a solid object or to provide gradient information for gray level gradient shading.

A gray level slice stack (slice stack) is generally composed of a set of parallel cross-sectional images (rasters) acquired by a scanner, and they can be arbitrarily spaced and offset relative to each other. Several pixel types are supported from 8 bit to 16 signed with floating point scaling factor. Planar, arbitrary and curved reformats (with user-defined thickness) are available for slice stacks. Slice stack can also be interpolated to generate isotropic volumes or resampled at a different resolution. They can be volume rendered with a variety of conventional compositing modes such as: Maximum Intensity Projection (MIP) and unshaded or shaded volume rendering. Multiple stacks can be registered and rendered together, each with a different compositing mode.

To generate binary solids, a wide range of segmentation operations are provided: simple thresholding, geometrical regions of interest (ROIs), seeding, morphological operations, etc. Several of these operations are available in both 2-D or 3-D. Binary solids can be reconstructed from slice stack, and shape interpolation can be applied during the reconstruction phase. Once binary solids have been reconstructed, logic operations (e.g. intersection) are available together with disarticulation and cleanup functionality. Texture mapping and arbitrary visibility filters are also available for binary solids.

The following is a list of relevant objects in this context:

| Object | Function |
|---|---|
| Cproj | Performs several different types of volume rendering |
| Vol | Compute all the view independent pre-processing |
| Ss | Collects a set of 2-D images (Raster) into a volumetric dataset |
| Bv | Collects and operates on binary volumes (bitvol) |
| Recon | Collects a stack of bitmaps and produces a bitvol |
| Sinterp | Interpolates, resample and re-map a slice-stack |
| Lim3 | Manages a set of axis-aligned 3-D clipping parameters |
| Extbv | Generates extruded or "tubular" bitvol based on one or more irregular regions of interest |
| Pvx | Manage a pixel value mapping |
| Pref | Manages progressive refinement in rendering by collecting the output of multiple rendering pathways |
| Rf | Manages the arbitrary reformat of a slice-stack |
| Bp | Performs operations with bitmaps |
| Geom2 | Manages 2-D geometry consisting of a list of lines, polygons, arcs and markers |
| Tx3 | Manages a 3-D coordinate transformation |
| Ras | Manages the data associated with a 2-D image |

Figure 6:
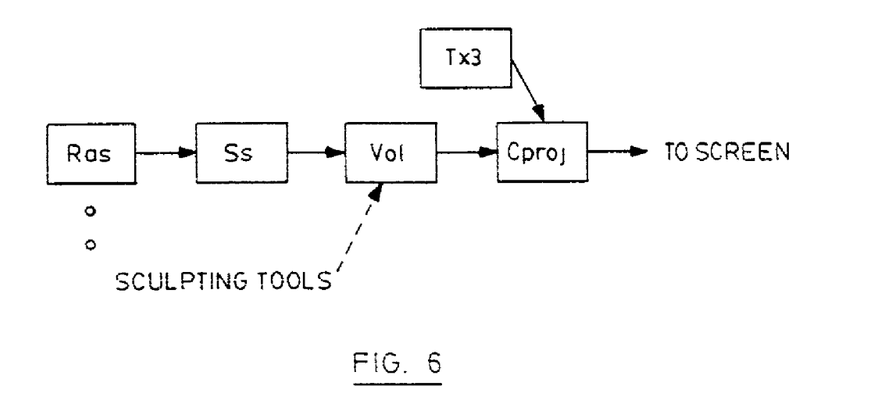
FIG. 6 is a schematic representation of a volume rendering pipeline.

A volume-rendering pipeline can be formed by instantiating and connecting few of these objects. The basic pipeline is shown in FIG. 6.

Images that are managed by Ras objects are aggregated to form a stack in the Ss object. Performing interpolation on the images forms a volume. The Cproj object then renders this volume, with location and orientation specified by the Tx3 object. Objects that implement the sculpting tools are normally connected to the Vol object as inputs.

Sculpting with the Interpolator requires that parallel regions of interest (ROI) be specified in various locations in volume space. To assist the drawing of these ROIs, many parallel cross sections of the volume have to be exposed to the user. This is achieved by connecting the Ss object to a Rf object that interpolates the input slice stack onto a cut-surface. The cut-surfaces can be at any locations and orientations. Moving a cut-surface along its normal axis allows the user to seethe various cross sections of the volume. At each cross section, the user specifies a ROI geometry that will be managed by a Geom2 object. The location and orientation information required by the reconstruction process can be obtained from the location and orientation of the viewport.

In the following example, the user draws a number of ROIs that are parallel to the input rasters. The Geom2 objects send the ROIs in bitmap form to a Recon object, which constructs a binary volume (bitvol) using the shape interpolation algorithm described above. When the Vol object receives this bitvol data, it ensures that only parts of the volume lying inside the bitvol are visible.

To construct the bitvol for the jigsaw tool, the Extbv object is used. Similar to a Recon object, this object exports a clipping bitvol to a connected Vol object. This object is actually a meta-object that consists of a combination of Bp and Recon objects.

The ROI specified by the user is processed by the Extbv object to produce a set of bitmaps (managed by Bp objects) that are used to construct the extruded bitvol. The Extbv object requires that the orientation and the location of the ROI in volume space be specified. As in the Interpolator tool scenario, the information can be obtained by mapping its location and orientation from viewport space to volume space.

The object-based architecture of the Processing Server allows the above sculpting techniques to be combined to produce a powerful and efficient sculpting tool. This is achieved by connecting the objects involved in various ways. One way of mixing the sculpting techniques is to connect both a bitvol exporter (Recon, Extbv) object and a Lim3 object to the Vol object. In this case only parts of the volume that are inside both the bitvol and the bounding box are rendered.

A second way to sculpt is to first duplicate a volume, and then applying various combinations of bitvols, created with the jigsaw and the Interpolator tools, to the two volumes. For example, the image in FIGS. 4(a) and 4(b) was created by the pipeline shown in FIG. 7.

Figure 7:
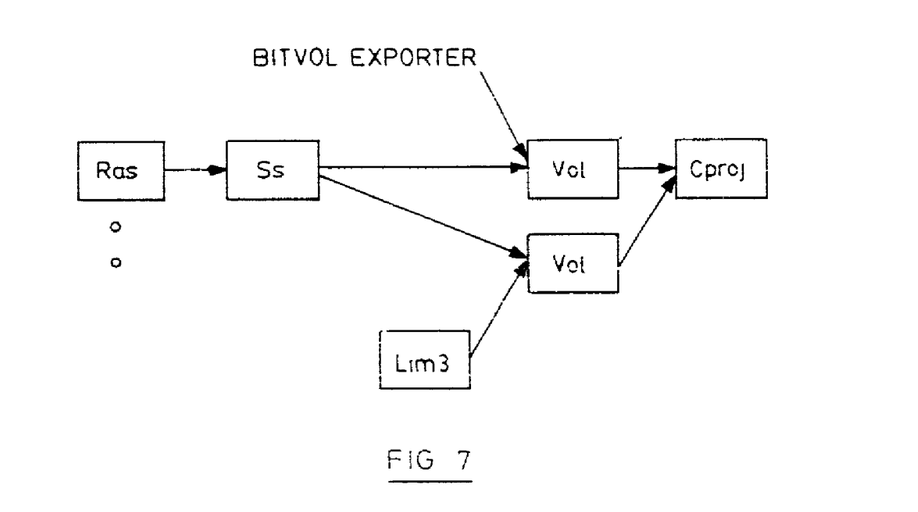
FIG. 7 is a representation of the pipeline used to create the images of FIGS. 4(a) and 4(b)
Figure 8A:
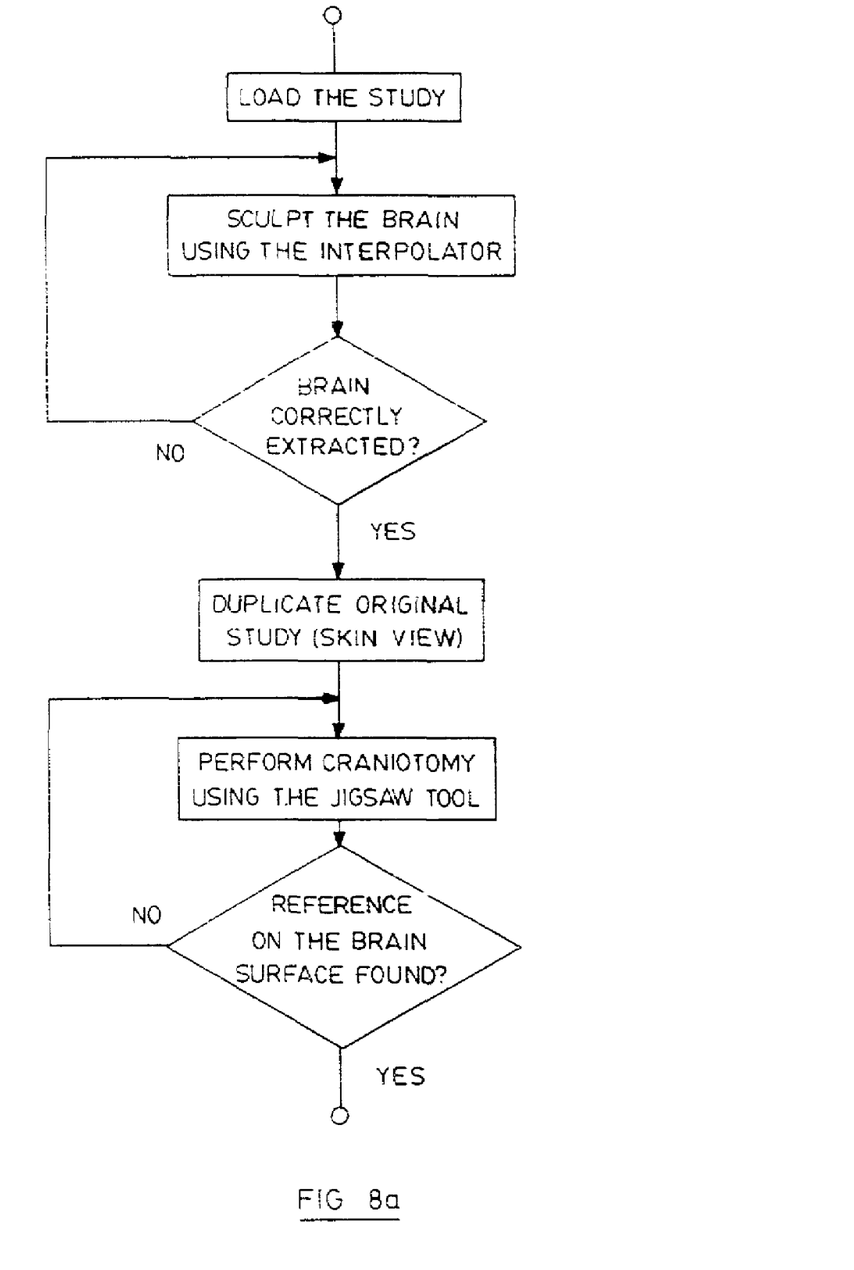
FIG. 8(a) is a flow chart showing the use of jigsaw tool.
Figure 8B:
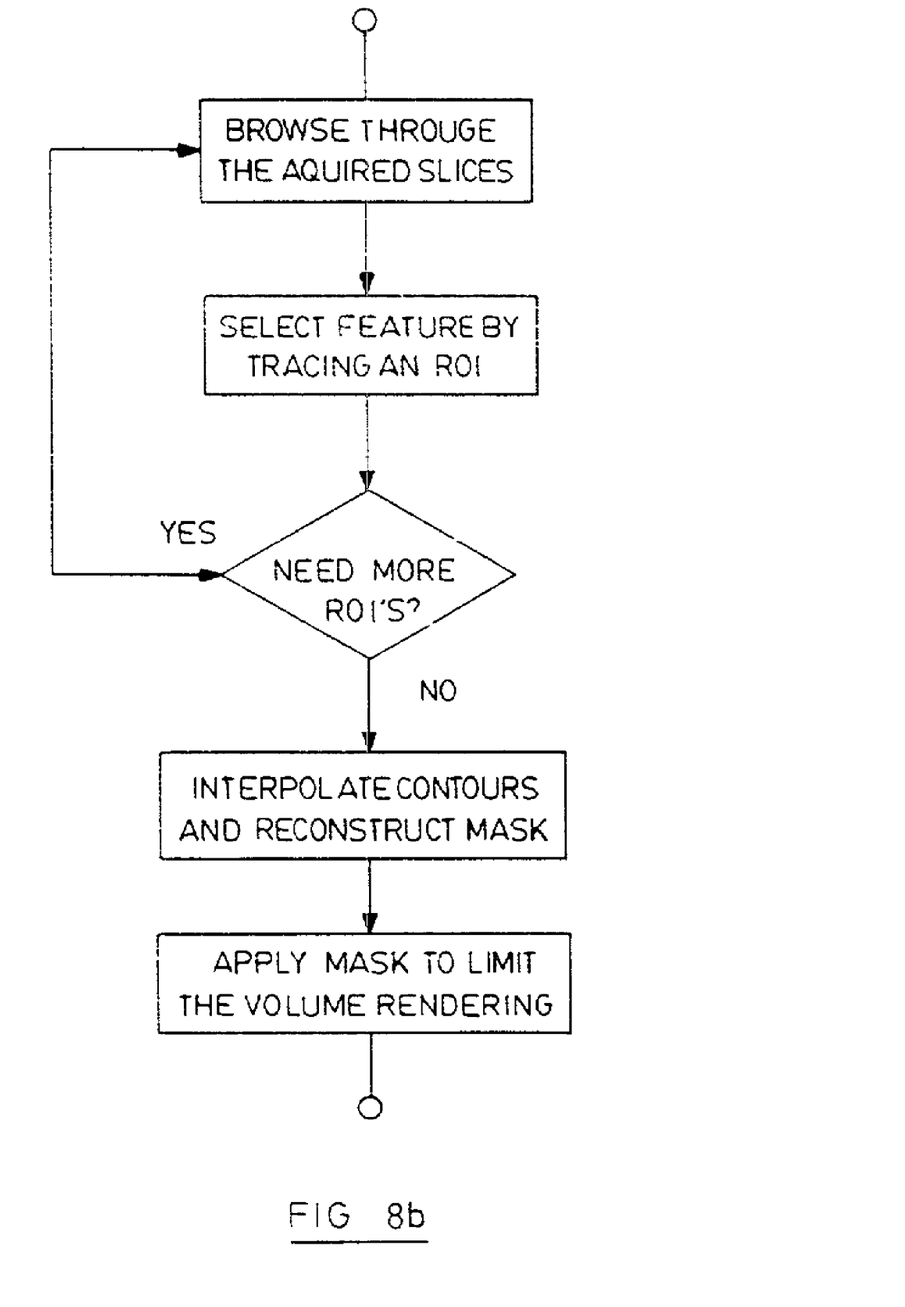
FIG. 8(b) is a flow chart showing the use of the interpolator tool.
Figure 8C:
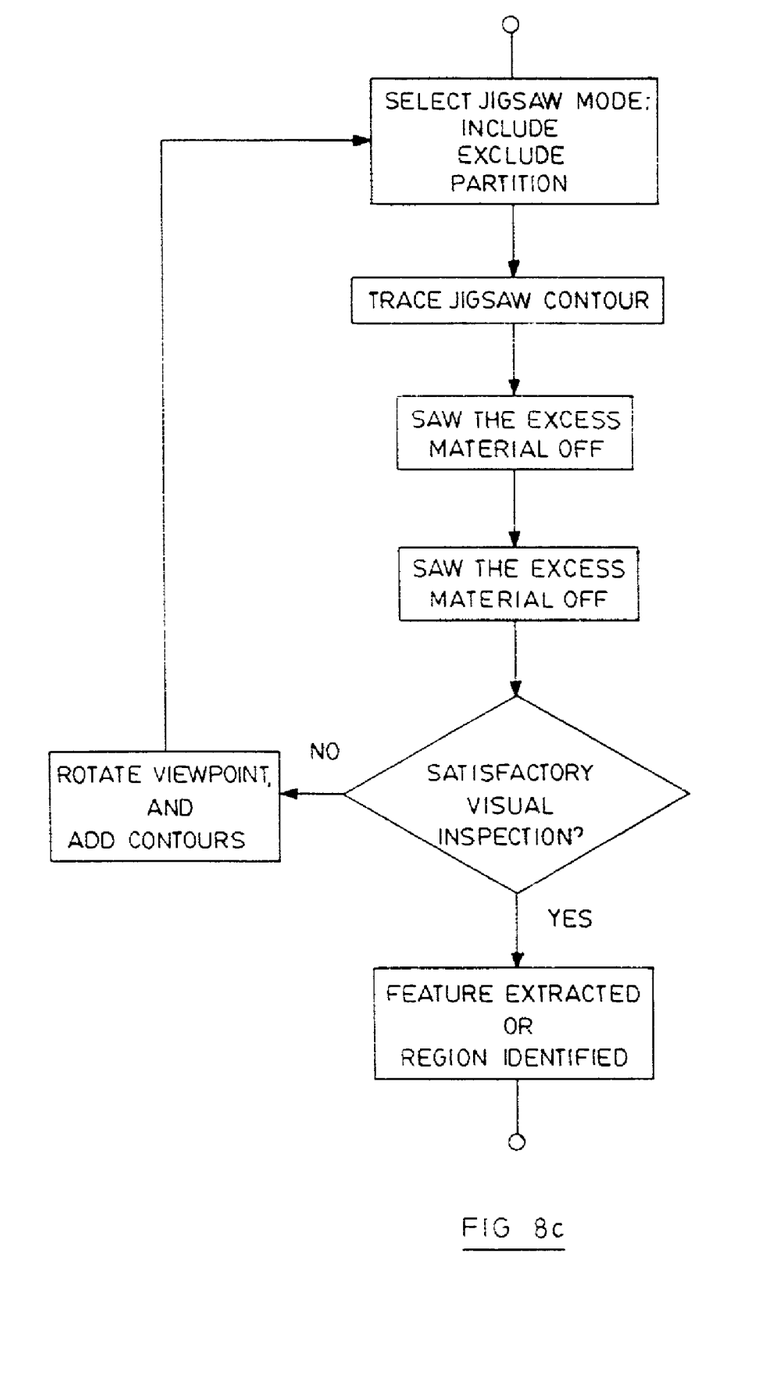
FIG. 8(c) is a flow chart showing a craniotomy on a MR study according to an embodiment of the invention.
Figure 8D:
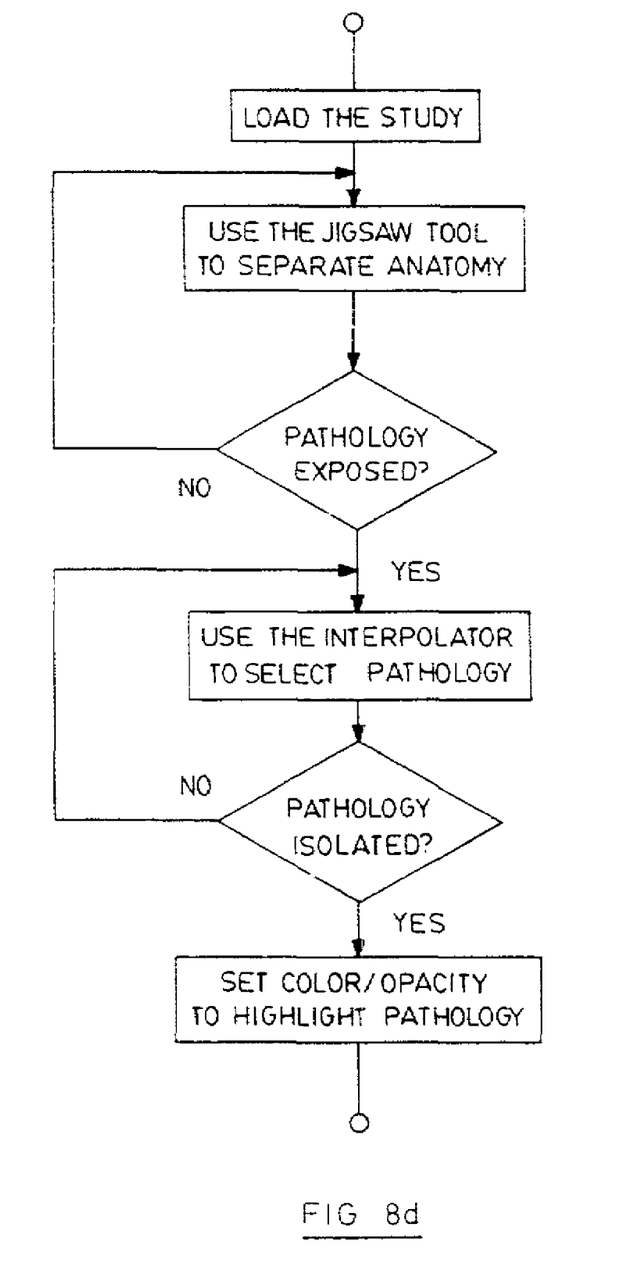
FIG. 8(d) is a flow chart showing an identification of a pathology in a CTA study.

In this case, the volume is duplicated by connecting the Ss object to two Vol objects. The two Vol objects are then rendered by the same Cproj object. Each volume is clipped differently. In the sample image, the head (the lower Vol object) is clipped by a Lim3 object, exposing the inner volume (the upper Vol object) that is clipped using shape interpolation.

Bitvols can also be created and modified using Bv objects. This object performs various logical operations such as adding, subtracting and intersecting on input bitvols. The intersection operation is especially useful for iterative refined clipping regions.

The image in FIG. 4 was produced by clipping the outer volume with the complement of the extruded bitvol specified by a ROI. The inner volume was clipped using a mask created by the interpolator tool.

In the sculpting techniques of the present invention, VOI and classification can be defined interactively in an iterative faction. In this context, the processing speed is an important factor, because the user preferably needs to visually assess the result of an operation before applying the next. Using a progressive refinement approach, the renderer is able to let the user interactively analyze a clinical size dataset and, if the results are not satisfactory, the operation can be easily undone and repeated. To allow interactive sculpting, each rendering pathway is accompanied by a duplicate that operates on a down-sampled version of the image data.

The embodiments of the invention in which an exclusive property or privilege is claimed are defined as follows:

1. A system of extracting a visual feature from a volumetric dataset using an approximate volume, the system comprising:
   a) a display for displaying said volumetric dataset;
   b) an input device for defining a selected number of regions distributed in the displayed volumetric dataset, each of the regions containing a cross section of said visual feature therein;
   c) an interpolator for generating the approximate volume containing the selected regions, the approximate volume comprising a set of voxels selected from said volumetric dataset;
   d) an operator for specifying a plurality of voxels not containing said visual feature in said set of voxels to generate a mask; and
   e) a volume renderer for using said mask to render said volumetric dataset to extract said visual feature therefrom;
   wherein the selected number of regions are a subset of the total number of images contained in said volumetric dataset.

2. The system according to claim 1, wherein the function of the operator is selected from the group comprising; specifying a region to be removed, and specifying a region to be visualized.

3. The system according to claim 2, wherein the operator classifies a transfer function selected from the group comprising; opacity, color, texture, and rendering mode.

4. The system according to claim 2, wherein said volumetric dataset comprises a set of cross sectional images.

5. The system according to claim 4, wherein each of the regions are polygons located on the surface of the corresponding selected cross sectional images.

6. The system according to claim 5, wherein the selected regions are oriented in a parallel spaced apart spatial relationship.

7. The system according to claim 5, wherein the set of cross sectional images are selected from the group comprising planar, arbitrary, and curved reformat slice stacks.

8. The system according to claim 4, wherein the number of regions is less than the number of cross sectional images contained in the set.

9. The system according to claim 2, wherein the regions are used by the interpolator to generate a plurality of approximate volumes for said volumetric dataset.

10. The system according to claim 9, wherein said plurality of approximate volumes are used to define multiple ones of the masks.

11. The system according to claim 10, further comprising a jigsaw tool to generate at least one of the plurality of approximate volumes.

12. The system according to claim 11, wherein the jigsaw tool extrudes a cylindrical approximate volume from one of the regions.

13. The system according to claim 12, wherein the direction of the extrusion is normal to the surface upon which the region is defined.

14. The system according to claim 2 further comprising an iterator for interactively applying the interpolator and the operator to the selected number of regions.

15. The system according to claim 14, wherein duplicate rendering pathways are employed by the iterator for facilitating interactive sculpting.

16. The system according to claim 15, wherein a down-sampled version of the volumetric dataset is employed during interactive sculpting.

17. A method for extracting a visual feature from a volumetric dataset, using an approximate volume, the method comprising the steps of:
   a) displaying said volumetric dataset;
   b) defining a selected number of regions distributed in the displayed volumetric dataset, each of the regions containing a cross section of said visual feature therein;
   c) generating through interpolation the approximate volume comprising a set of voxels selected from said volumetric dataset;
   d) specifying a plurality of voxels not containing said visual feature in said set of voxels to generate a mask; and
   e) rendering using said mask on said volumetric dataset to extract said visual feature therefrom;
   wherein the selected number of regions are a subset of the total number of images contained in said volumetric dataset.

18. A method according to claim 17 further comprising the step of selecting the function of the operator from the group comprising: specifying a region to be removed, and specifying a region to be visualized.

19. The method according to claim 18 further comprising the step of classifying the plurality of voxels by a transfer function selected from the group comprising: opacity, color, texture, and rendering mode.

20. The method according to claim 18, wherein said volumetric dataset comprises a set of cross sectional images.

21. The method according to claim 20, wherein each of the regions of polygons are located on the surface of the corresponding selected cross sectional image.

22. The method according to claim 21, wherein the set of cross sectional images are selected from the group comprising planar, arbitrary, and curved reformat sliced stacks.

23. The method according to claim 20, wherein the number of regions is less than the number of cross sectional images contained in the set.

24. The method according to claim 18 further comprising the step of interpolating between the selected regions to generate a plurality of the approximate volumes for said volumetric data set.

25. The method according to claim 24 further comprising the step of defining multiple ones of the masks using said plurality of approximate volumes.

26. The method according to claim 25 further comprising a step of extruding a cylindrical approximate volume from one of the regions.

27. The method according to claim 26, wherein the direction of the extrusion is normal to the surface upon which the region is defined.

28. The method according to claim 18 further comprising the step of interactively performing the step of generating to interpolate the approximate volume and the step of specifying a plurality of voxels not containing said visual feature to the selected number of regions.

29. The method according to claim 28, wherein duplicate rendering pathways are employed for facilitating the interactive sculpting.

30. The method according to claim 29, wherein a downsampled version of the volumetric dataset is employed during interactive sculpting.

31. An article of manufacture comprising:
a) a computer usable medium having computer readable program code embodied therein for extracting a visual feature from a volumetric dataset using an approximate volume, the dataset representing an image of an object, the computer readable program code in said article of manufacture comprising;
b) the computer readable program code configured to cause the computer to display said dataset;
c) the computer readable program code configured to cause the computer to receive input for defining a selected number of regions distributed displayed volumetric dataset, each of the regions containing a cross section of said object therein;
d) the computer readable program code configured to cause the computer to generate through interpolation the approximate volume containing the selected regions, the approximate volume comprising a set of voxels selected from the volumetric dataset;
e) the computer readable program code configured to cause the computer to specify a plurality of voxels not containing said object in said set of voxels to generate a mask; and
f) the computer readable program code configured to cause the computer to use said mask for rendering said volumetric dataset to extract said object therefrom;

wherein selected number of regions are a subset of the total number of images contained in said volumetric dataset.

32. The article of manufacture according to claim 31, wherein the function of the computer code for specifying the plurality of voxels is selected from the group comprising; specifying a region to be removed, and specifying a region to be visualized.

* * * * *

UNITED STATES PATENT AND TRADEMARK OFFICE
CERTIFICATE OF CORRECTION

PATENT NO. : 6,995,763 B2
DATED : February 7, 2006
INVENTOR(S) : Gatti, Claudio et al.

It is certified that error appears in the above-identified patent and that said Letters Patent is hereby corrected as shown below:

Column 2,
Line 56, insert -- in the -- between "distributed" and "displayed".

Column 10,
Line 14, insert -- in the -- between "distributed" and "displayed".

Signed and Sealed this

Ninth Day of May, 2006

JON W. DUDAS
*Director of the United States Patent and Trademark Office*